(12) United States Patent
Zimmerman

(10) Patent No.: US 6,265,975 B1
(45) Date of Patent: Jul. 24, 2001

(54) PROXIMITY SYSTEM FOR BAGGAGE

(76) Inventor: Harry I. Zimmerman, 310 Comstock Ave., Los Angeles, CA (US) 90024

(*) Notice: Subject to any disclaimer, the term of this patent is extended or adjusted under 35 U.S.C. 154(b) by 0 days.

(21) Appl. No.: 09/512,965

(22) Filed: Feb. 25, 2000

(51) Int. Cl.[7] .................................................. G08B 13/14
(52) U.S. Cl. ................. 340/571; 340/309.15; 340/573.1; 340/825.04; 455/38.3; 455/343
(58) Field of Search ............................ 340/571, 573.1, 340/573.3, 573.4, 309.15, 825.04, 825.34; 455/38.3, 343; 370/311

(56) References Cited

U.S. PATENT DOCUMENTS

| | | | |
|---|---|---|---|
| 4,675,656 | * 6/1987 | Narcisse | 340/539 |
| 5,255,306 | * 10/1993 | Melton et al. | 379/38 |
| 5,576,692 | * 11/1996 | Tompkins et al. | 340/571 |
| 5,583,488 | * 12/1996 | Sala et al. | 340/568 |
| 5,589,821 | * 12/1996 | Sallen et al. | 340/573 |
| 5,627,520 | * 5/1997 | Grubbs et al. | 340/572 |
| 5,963,131 | * 10/1999 | D'Angelo et al. | 340/568.1 |
| 6,069,901 | * 5/2000 | Hulyalkar et al. | 370/509 |
| 6,075,443 | * 6/2000 | Schepps et al. | 340/573.4 |
| 6,108,636 | * 8/2000 | Yap et al. | 705/5 |
| 6,122,271 | * 9/2000 | McDonald et al. | 370/345 |

* cited by examiner

*Primary Examiner*—Daniel J. Wu
*Assistant Examiner*—Phung T Nguyen
(74) *Attorney, Agent, or Firm*—Curtis L. Harrington

(57) ABSTRACT

A communication system is provided which can be realized in a number of ways to facilitate baggage tracking and recovery. In the most rudimentary realization, the traveler receives a signal from transmitters placed in the baggage which can identify the presence of each item of baggage by a code number which may show either as the code number or as a user supplied personal designator for a particular item of luggage. The transmitter is inexpensive and low power but works well in the aircraft environment and causes no interference with aircraft control, communication or navigation equipment. Advanced versions of the invention include programmability and transponder control as well as enhanced audio signalling.

12 Claims, 5 Drawing Sheets

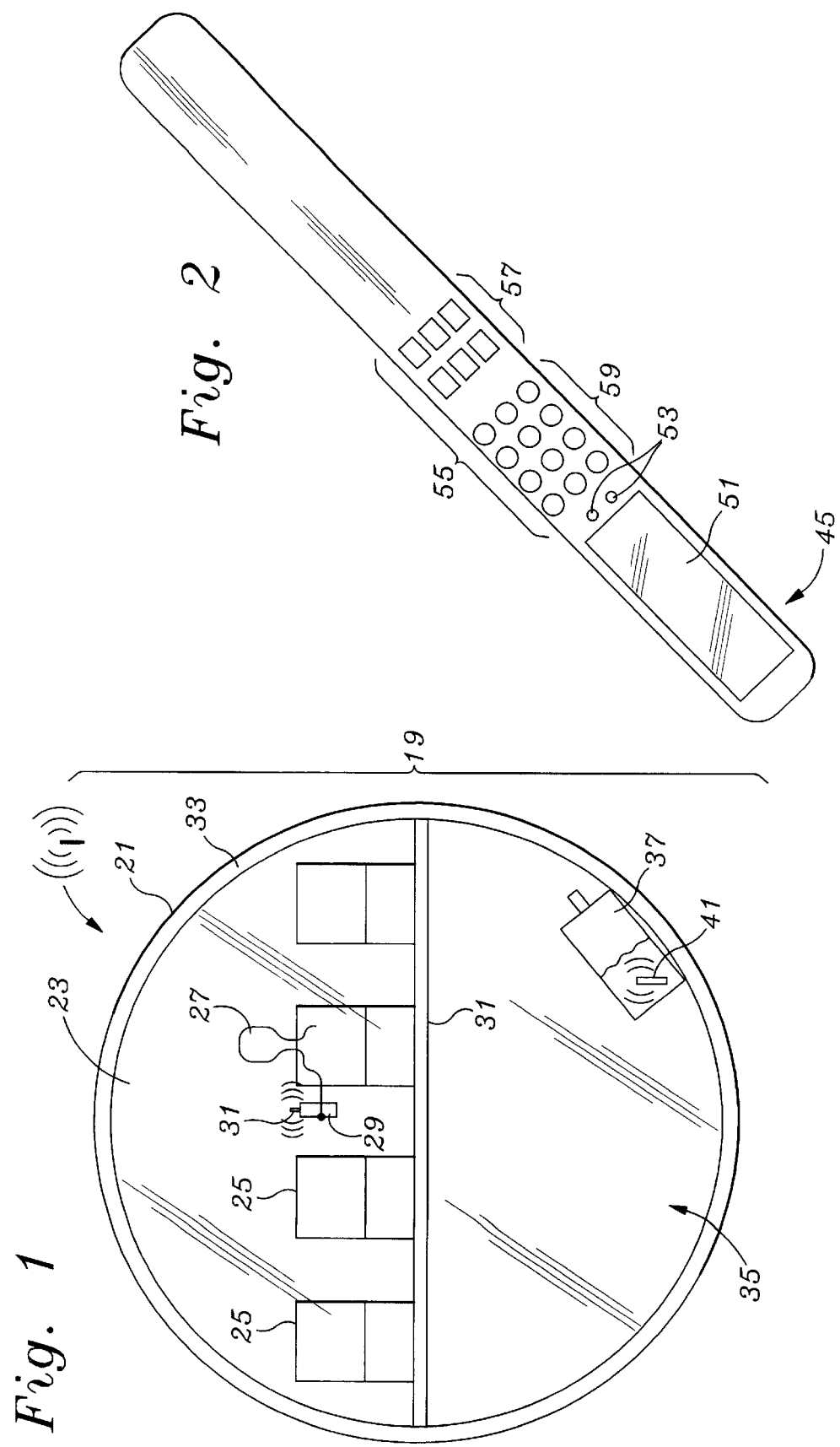

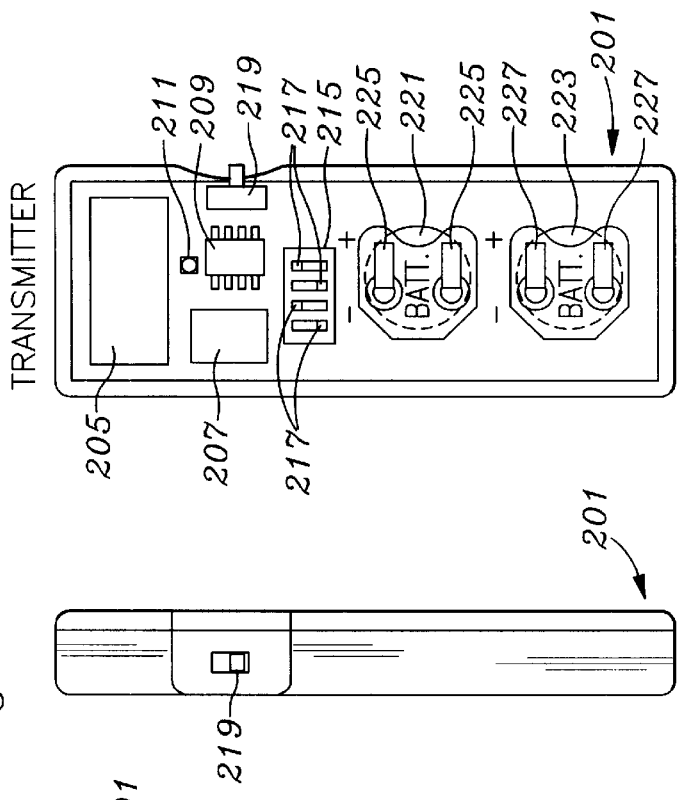
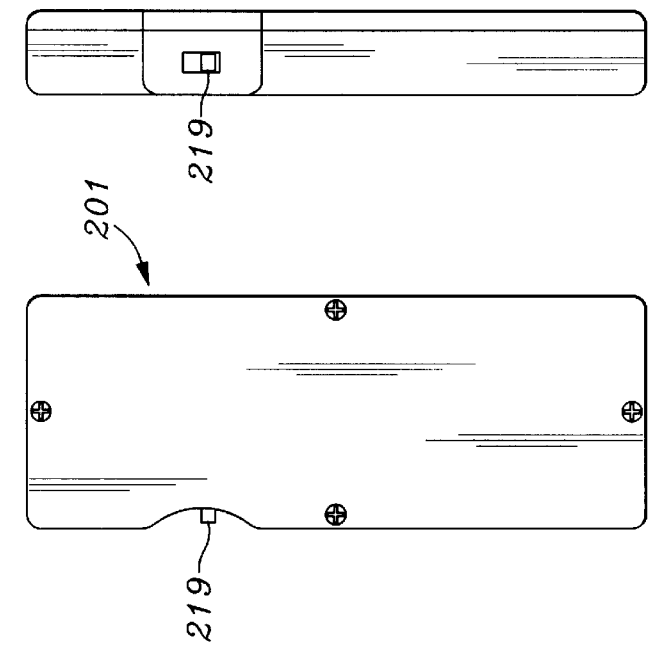
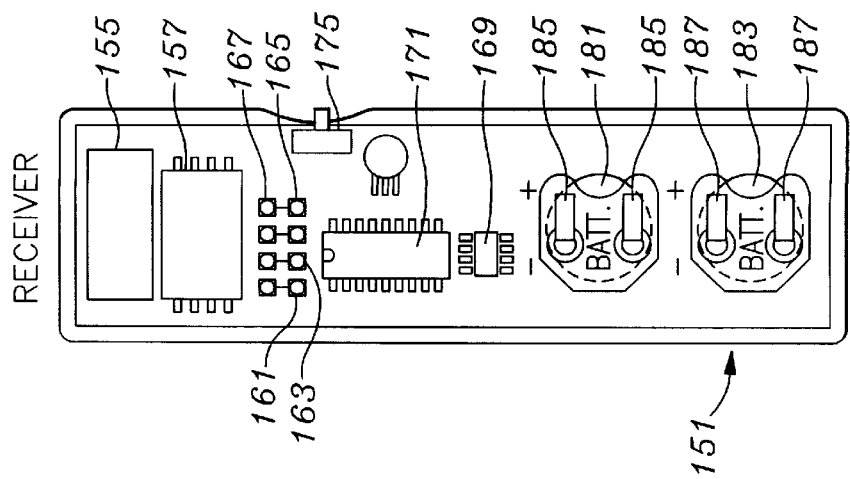

PROXIMITY SYSTEM FOR BAGGAGE

FIELD OF THE INVENTION

The present invention relates to a system especially for airline travelers whose travel articles, such as baggage and the like, may be separated from the traveler and hidden from view and which identifies the presence of the travel articles confirming for the passenger that the articles have not been left behind or routed on another aircraft, or in the alternative letting the traveler know that his bags are in fact left behind or routed onto another aircraft to give the traveler the ability to plan ahead and compensate by making alternative plans such as the taking of early action to insure that they are quickly located and to lessen the time during which the articles are unavailable.

BACKGROUND OF THE INVENTION

One of the biggest problems frequent air travelers have, and it is reflected in numerous surveys, is the fears and concerns which airline travelers today have about their bags and packages, which are turned over to the airlines to be carried as checked baggage, is a delay or misrouting of baggage especially such that the baggage is not traveling with the traveler. In addition, today's air carriers use a hub system that many times forces a traveler and his articles to change airplanes before reaching their final destinations. Many times a passenger's articles will begin a trip together only to be separated at a transfer point, especially the airlines's hub, during the journey.

The fact that a traveler knows that there is a chance of separation from baggage and checked articles causes concern, worry, and a feeling of helplessness. If the traveler were to positively have an indication that the bags were on the flight with him, the traveler would be able to relax, have a more enjoyable flight and concentrate all of his attention on working, reading, conversing or other activities during the flight. If the traveler were to positively have an indication that the bags were not on the flight with him, the traveler would be able to take steps to remedy the problem. For example if the traveler had knowledge that his bags were in fact separated from the traveler, he would be able to plan ahead by coordinating with the airline and others about replacing necessary articles, clothing, and the like at his destination to make up for any delay or ultimate loss of the articles and baggage. In addition, if the traveler knew at what physical location the separation of his articles and luggage occurred, especially in a journey requiring multiple changes in aircraft, he would be able to pass this superior knowledge on to the air lines to assist them in locating the luggage and articles which were separated. This information would be of value not only to the traveler, but to the airlines as well in achieving an efficient recovery of the bag.

An ancillary problem is the wait and uncertainty faced by a traveler in having to debark, walk to the baggage claim and locate his luggage and articles. In some cases the luggage and articles may already have been available for others to mistakenly take as their own. In other instances, the traveler has to wait and compete for his luggage and articles around a crowded carousel. Even when the traveler arrives at the carousel before his luggage and articles arrive, he may not see his checked belongings when they first emerge or they may be mistakenly removed by someone else.

Further, a traveler who is forced to wait at a carousel to defend possession of his luggage and articles will likely have to wait a second time in order to arrange ground transportation. Because people are so protective of their luggage and articles, they will rarely leave the carousel to chance while taking the opportunity for a rental car or shuttle transaction during the time before the luggage and articles arrive.

The separation of an airline traveler from his lug. Any time that a traveler changes planes, and particularly when the passenger's arrival time is close to the next departure time, especially at a hub connection, there is a significant probability that the baggage will not make the flight on which the passenger has boarded. Also, depending upon the layout of the airport, and especially at a large hub where the physical distance between the arrival gate and the departure gate is large, a passenger making a tight connection may miss the next flight even though his baggage made it onto the plane.

Another danger which increases the worry of airline travelers is the possibility that the identity ticket on the checked baggage may become torn off inadvertently through ordinary handling. In this event, the luggage is certain to miss transfer at a hub, and even if it makes it way to a destination, the traveler may have trouble identifying it as his own, may increase the chances of being inadvertently claimed by someone else, and may also have trouble convincing gate security that the luggage and articles with the missing tag is his.

The baggage systems and airport security from air line to air line varies greatly. Some air lines use a computer to keep up with the baggage. Other air lines simply react only after a passenger is unable to locate their baggage. Where the baggage follows the passenger, the passenger can simply wait at the airport and only hope that it arrives. Where the baggage travels ahead of the passenger, there is some increased chance that it may be lost or stolen. If the passenger could call ahead, either from an aircraft phone or a personal phone, arrangements could be made to have the baggage collected as soon as it is available and held for later pickup after a positive identification of the owner.

The most overriding reason that it is valuable for the traveler to know if his baggage is accompanying the traveler is that many airports have such lax security that if the traveler is not on hand to collect the baggage when it is first made available to the passengers, there is a likelihood that it will be stolen.

Further, with the problems associated with the air line liability for lost baggage and the like, any system, no matter how rudimentary, which gives the air lines the ability to cut losses, would be welcome.

Another problem with baggage which does not travel in unison with the traveler is that of location and transfer. Baggage which travels on another flight is generally never separated from the baggage made available to the travelers of the arriving flight. As such, it becomes apparent that the baggage will maintain its unclaimed status only after a long time has passed since it was made available. This time period can be as long as an hour and a half, and where only one or a few baggage output areas are available, and during busy times, the baggage may not be identified as unclaimed for hours. As a result of any of these delays, and when the traveler makes inquiry at the destination location, the baggage, not being immediately held by the baggage claim department, is technically lost, and personnel have to be dispatched to look for it.

Other problems may compound the initial problem of baggage not traveling in unison with the traveler, including torn, damaged or removed destination tags, additional opportunity for pilferage by air line employees, and the like.

Again, since most of the problems associated with lost baggage begins with a separation of the baggage from in-unison travel of the passenger, the most rudimentary help would include an early notification of the air line so that the baggage could be identified, located and segregated in order that more complete control over the baggage can be established. Secondarily, in transmitting the information to the air line baggage department, it would be important to know how many items of baggage were missing and if possible which items of baggage were missing, including a description of the physical shape and color of the baggage item.

What would be of even further help would be a device or method to aid in physical location of an item of lost baggage. As a beginning step, a system which would assist the owner of the baggage in personally locating it, perhaps in assistance with air line personnel would prove helpful. A system which is standardized and in which the air lines also shared in data base identification would even more greatly help as it would provide complete coordination between the traveler and the air line and reduce the instances of lost baggage to a minimum.

SUMMARY OF THE INVENTION

A communication system is provided which can be realized in a number of ways to facilitate baggage tracking and recovery. In the most rudimentary realization, the traveler receives a signal from transmitters placed in the baggage which can identify the presence of each item of baggage by a code number which may show either as the code number or as a user supplied personal designator for a particular item of luggage. The transmitter is inexpensive and low power but works well in the aircraft environment and causes no interference with aircraft control, communication or navigation equipment. A first aspect of a preferred embodiment of the transmitter is programmable with an identification code of sufficient length to avoid interference with other codes. A second aspect is programmability as to transmitter mode. Depending upon the length of the trip being undertaken, pre-programmability can enable the user to instruct the transmitter to transmit during time windows when the user wants to know about the physical accompaniment of the baggage, such as times surrounding departure of the initial flight and the times surrounding the departure of the connecting flight. In addition, a rescue mode is programmable into the transmitter for a beacon signal at high power at given times and optionally a locator beacon at other times. Programmability of the transmitter is highly adaptable to (1) a custom receiver provided, (2) a custom control transceiver provided, or (3) the use of other receivers and transceivers through cloning or duplication of the send and receive identification information.

The frequency mode of operation can be radio frequency electromagnetic waves modulated with identity and information as amplitude modulation, frequency modulation, pulse width modulation, spread spectrum, the family radio frequencies at the 400–500 megahertz range, the cell and pager frequencies at 900 megahertz and higher frequencies. The system may also use sonic transmission and reception in addition to the radio frequency operating modes. Preferably, the frequency mode of operation can be programmable to include any number of frequencies at least sequentially.

As a result of the above, the invention can be provided to the user as a simple transmitter for use in conjunction with a user's pre-existing pager or pre-existing cell phone or receiver. At the next level, the system of the present invention can be provided as a transmitter and receiver system where the user can program the transmitters included with the baggage and then utilize the receiver to get a more exact readout of the status of the baggage. In addition, the receiver can carry a signal strength indicator which is useful in indicating the proximity of the baggage. At the next level, the transmitter which is placed with the baggage is replaced with a transponder and the custom receiver of the user becomes a transceiver. In this embodiment level, maximum efficiency is obtained. The startup protocol can include: (1) a timer in the transponder to turn on and off during a narrow window during which the traveler's transceiver can bring the transponder to full power and interrogate multiple transponders as to their identity and presence.

The advantages of the ability of the traveler to use the system of the invention are several. Where one piece of baggage is missing, the user can then contact the air lines and notify them, in some cases in time to correct a small routing problem and include the baggage on the flight. In other cases, the airline may be able to find the luggage early enough to then specially route the luggage on another flight or even another carrier such that it catches up with the traveler at the next stop.

Another advantage is at the arrival terminal. The traveler will be notified by the system when his luggage and articles enter the room. Thus, while others stand around the carousel, the traveler using the system of the invention can transact business at the rental car or ground transportation area, which is typically in the same room or closely adjacent to the baggage carousel. As the luggage or articles enter the room, the traveler's receiver will indicate the arrival. This can be accompanied by a beep, a light illumination, as well in a manner which will indicate which bags have arrived. Even if the traveler is in the midst of transacting business, it will be an easy matter to simply step over to the carousel, retrieve the article and then return to a counter where business was being transacted.

Using this system, the traveler saves not only piece of mind but a tremendous time saving as well. Further, in any situation outside of the aircraft, rather than fight the crowds around the carousel, the traveler can observe his baggage arrive into the room, on his hand held monitor, piece by piece.

Further, in the event that the traveler's baggage is lost, he can accompany a baggage employee with the hand held monitor to indicate the articles's presence. The traveler can further send a signal to the bags to emit any of a number of sounds from a short beep to a siren blast to facilitate finding the baggage.

As will be shown in the Figures and description, the system of the present invention is realizable in a wide variety of levels of complexity and communicative overlay. In general, a larger and more sophisticated version of the invention will be initially shown, followed by a more compact and simple version.

In one embodiment of the communications topology, the transmitter associated with the luggage would emit a series of two or three short pulses of from approximately about less than a second each to about a second each and sent about every ten seconds within a first period as a sending interval, and then followed by a second period as a rest period of about one minute of rest. For example, where two pulses are sent within twenty seconds, followed by a one minute rest period, a one minute and twenty second minimum length action cycle is created. Thus, an indicator unit would have a listening period longer than the minimum length action cycle and may have multiples of such cycle. Further, since the system of the invention utilizes multiple transmitters, and although the probability is small, to prevent doubling transmission signals from consistently interfering with each other, at least one of the length of the rest cycle and the minimum ten second transmission spacing is randomized so that the rest cycle can be greater or less than about a minute, and so that the transmission spacing can range from the minimum ten seconds to about 30 seconds. It is preferable that if one of the transmission spacing and rest period is randomized that the other be complimentarily shortened to give a maximum operational window which does not exceed the maximum time which the indicator unit of the invention is switched on and is actively looking for the signal. Even with such complementary randomization, a very low magnitude duty cycle is created and allows for an extended battery life. In a larger version this extends battery life such that the batteries are more likely to fail from age and environmental effects than depletion of current. In a smaller, more compact version, even coin sized batteries supplying power supporting only a transmit function would enable a battery life of two years or more.

The more sophisticated system would include a transceiver which could communicate and command the transmitter and contemplates a transmitter with other capabilities including frequency band switching, frequency mode of transmission, audible signaling and more. The simplest system would include a small, preferably only simply programmable or of dedicated prespecified function and which could be clipped onto the belt, or carried in the pocket or purse. The smaller version would preferably have a diode or crystal display that would indicate that it has received an identity signal from the luggage or other articles to show the traveler that such luggage or other articles have been loaded aboard the aircraft while the traveler is also on board. Even on the small, lightweight version of the receiver, an indicator will preferably be able to receive signals from four to six transmitters located in from four to six separate units of luggage. Each of the different transmitters, one for each unit of luggage, would preferably carry its own code which would be modulated onto its transmitter signal.

Regardless of complexity, the receiver of the invention would have the capability for both a shutdown after several minutes of operation, as well as a shutdown after receiving a signal from the numbers of different units of luggage on the trip. For example, if there are three codes to be detected, and all three are in fact detected, the unit could shut itself down to conserve power. On subsequent power-up, and before the circuit is cleared for another probing of the transmitter's presence within the aircraft, the receiver unit can simply indicate the presence of the transmitters. This will conserve power by not having to keep the receiver on for long periods of time, and the power necessary to store a simple indication of having received the signal is de minimis. Low power is an advantage both to the traveler and within the aircraft environment. For example, smoke detectors have currently been approved for aircraft use in a wireless system where the power is of insufficient magnitude to interfere with aircraft electronics, yet secure in communications to perform its important function. The utilization of low power within an aircraft is especially facilitated by modern aircraft internal barriers, floors, and surroundings, which are made of composite material. The random communicative aspect derives from a sparse number and location of portals through which the signal could have passed if such were available, as well as a concomitant high dependence upon orientation toward such portals, on behalf of both the transmitter and the receiver. Further, high power transmitters would be just as likely to give a "presence" reading from 100 yards away on the tarmac as they would inside the aircraft. Currently used composite and fiberglass supports within the fuselage are transmissive of electromagnetic radiation and contribute to the ability to effectively utilize low power on the system of the invention. Other issues include the use of a power and frequency which will not interfere with the aircraft electronics. Smoke detectors now in utilization on aircraft have a power output and frequency and operating mode in conformity with those described for the present invention and have shown to be compatible with the electronic environment of the basic aircraft electronics. The preferred embodiment may have ordinary single direction polarization or circular polarization, particularly if there is enough room for a phased array.

BRIEF DESCRIPTION OF THE DRAWINGS

The invention, its configuration, construction, and operation will be best further described in the following detailed description, taken in conjunction with the accompanying drawings in which:

FIG. 1 is a cross sectional view of an aircraft illustrating the passenger compartment in which a traveler operates an indicator unit and a baggage compartment having baggage unit containing a baggage location unit;

FIG. 2 is a perspective view of one possible embodiment of a full capability programmable transponding baggage location unit;

FIG. 8 is a plan view of the internals of a minimalist version of the indicator unit for indicating the proximity of a minimalist badge location unit within an aircraft;

FIG. 9 is a plan view of the internals of a minimalist version of a baggage location unit which is specifically designed for operation and,use with the minimalist baggage location unit of FIG. 8, within an aircraft;

FIG. 10 is a rear view of the baggage location unit of FIG. 9; and

FIG. 11 is a side view of the baggage location unit of FIGS. 9 and 10.

DETAILED DESCRIPTION OF THE PREFERRED EMBODIMENT

Figure 3:
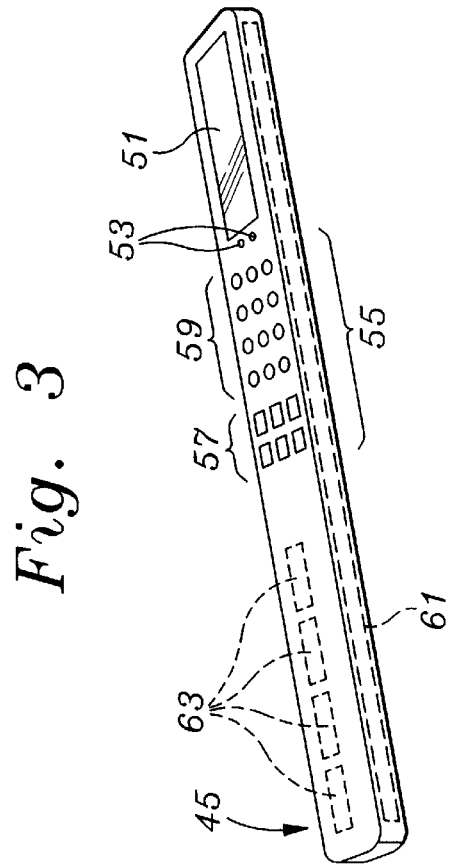
FIG. 3 is a reverse view of a full function baggage location unit seen in FIG. 2 and illustrating a possible configuration of antenna and battery supply in phantom.

Referring to FIG. 1, a luggage tracking system 19 is best described beginning with a sectional view of an aircraft 21 indicates a passenger cabin area 23 having typical seating 25 and a seated passenger 27. The passenger 27 holds an indicator unit 29 which may have an internal or an external antenna 31 for facilitating reception or transmission and reception of an electromagnetic signal.

The seating 25 is supported by a flooring structure 31 which is attached to an air frame 33. The flooring structure 31 in older model aircraft is typically metal with multiple openings and conduit passageways which enable radio frequency signals to pass through, especially adjacent points of attachment to the air frame 33. Ne Below the flooring structure 31, and at certain lengths along the aircraft fuselage, is a baggage hold space 35. Within the baggage hold space 35 may be located one or more units of baggage or baggage 37. Inside the baggage 37 is a baggage location unit 41. As will be seen, the baggage location unit 41 can be available in a variety of embodiments as can the indicator unit 29.

Referring to FIG. 2, a plan view of one embodiment of a location unit 41 is seen as a location unit 45. It is clear that the location unit 41 can be in any physical configuration, but to help match the antenna length advantages, and for concealment an elongate form has advantages. Shown on the location unit 45 is a liquid crystal display 51 which can be made to show programming status, output mode, output power, battery level and transmitter mode and power output history. Other attributes which are of interest in relation to the environment of the baggage can be included, such as atmospheric pressure, temperature, humidity, global positioning data and the like. These aspects enable the traveler, on recovery, to examine the location and conditions of the physical location and environment in which the baggage has been kept.

The location unit 45 can include one or more light emitting diodes 53 which can be useful for indicating power levels, charge and programming assistance, as well as an input keypad 55 including a series of command keys 57 and an alpha numeric keypad 59 assist in programming.

Referring to FIG. 3, a reverse look at the location unit 45 enables the showing of additional details in phantom without obscuring the input and output programmability features seen in FIG. 2. An antenna 61 is shown in dashed line format as occupying virtually the length of the location unit 45. The ability to include an internal antenna having a length approaching no more than half of the natural wavelength of the frequency selected is of benefit not only in power efficiency but in the physical ability to have the signal transmitted. In the Family frequency at the 400–500 megahertz range, the natural wavelength is about ⅔ of a meter. This size may be a bit long for a full wave antenna and thus for this frequency, a half wave dipole could be used as the antenna 61. At the 900 megahertz band, the natural antenna length is about ⅓ meter. In the highest capability, the transmitter may have the ability to transmit on several frequencies. Transmitter chips are being standardized for multi-band operation in the amateur and commercial services. For 1.5 gigahertz, for example, the antenna length is about 0.2 meters and for 2.5 gigahertz about 0.12 meters. As such, the antenna 61 may be trapped for half wave operation at the 400–500 megahertz band and tuned for full wave operation on frequencies at and above 900 megahertz. Such multi-band antennas are commonly commercially available, or easily producible. An overall length of about one foot or less for the location unit 45 is a convenient size. Also shown in phantom is a series of batteries 63 placed end to end. A "AAA" battery size enables a thickness of the location unit 45 of about 7/16 of an inch to about a half of an inch. This thickness lends to the location unit 45 the ability to be easily concealed in any type of baggage or baggage 37. However, it is preferable that the baggage 37 not provide a sealed completely surrounding conductor, such as a completely metal suitcase. If such a suitcase or brief case is provided, it can be retrofitted with an inside pickup antenna connected to an outside antenna, such as a passive port antenna used in buildings to enable weak cellular phone communication signals to communicate outside of the building. Such a port antenna would typically include an internal antenna not grounded to the metal body, and electrically connected to an external strip of material serving as an external antenna through the metal body in a manner insulated from grounding with the metal body. However, most baggage, packages and baggage are made from non-conductive materials and the use of the location unit 45 without further concern for outputting of an electromagnetic signal is believed to be the norm for the vast majority of the time.

Figure 4:
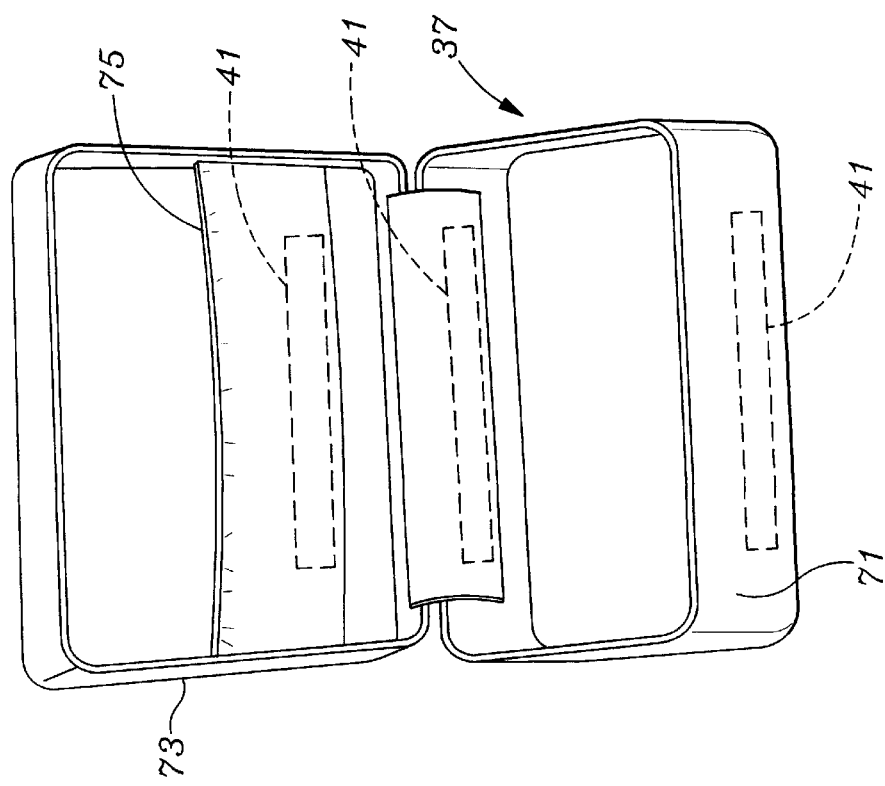
FIG. 4 is a schematic representation of a unit of baggage and illustrating the potential placement of the baggage location unit of FIGS. 2 and 3.

Referring to FIG. 4, a baggage unit 37 as an example is shown in open position. The baggage unit 37 has a base 71 and a lid 73 with a compartment 75. A hinge cover flap 77 is seen extending between the base 71 and the lid 73. As is shown in phantom, the compartment 75 can easily and concealably fit the location unit 45. The hinge cover flap 77 provides another venue for the location unit 45 as it can be secreted into a location where it will likely not be discovered. Another possibility is seen just inside the front of the base 71 where it can be placed inside of a cloth covering, a lining or other structure. The cover flap 77 location and the location inside the front of the base 71 also provides protective reinforcement for the location unit 45.

Figure 5:
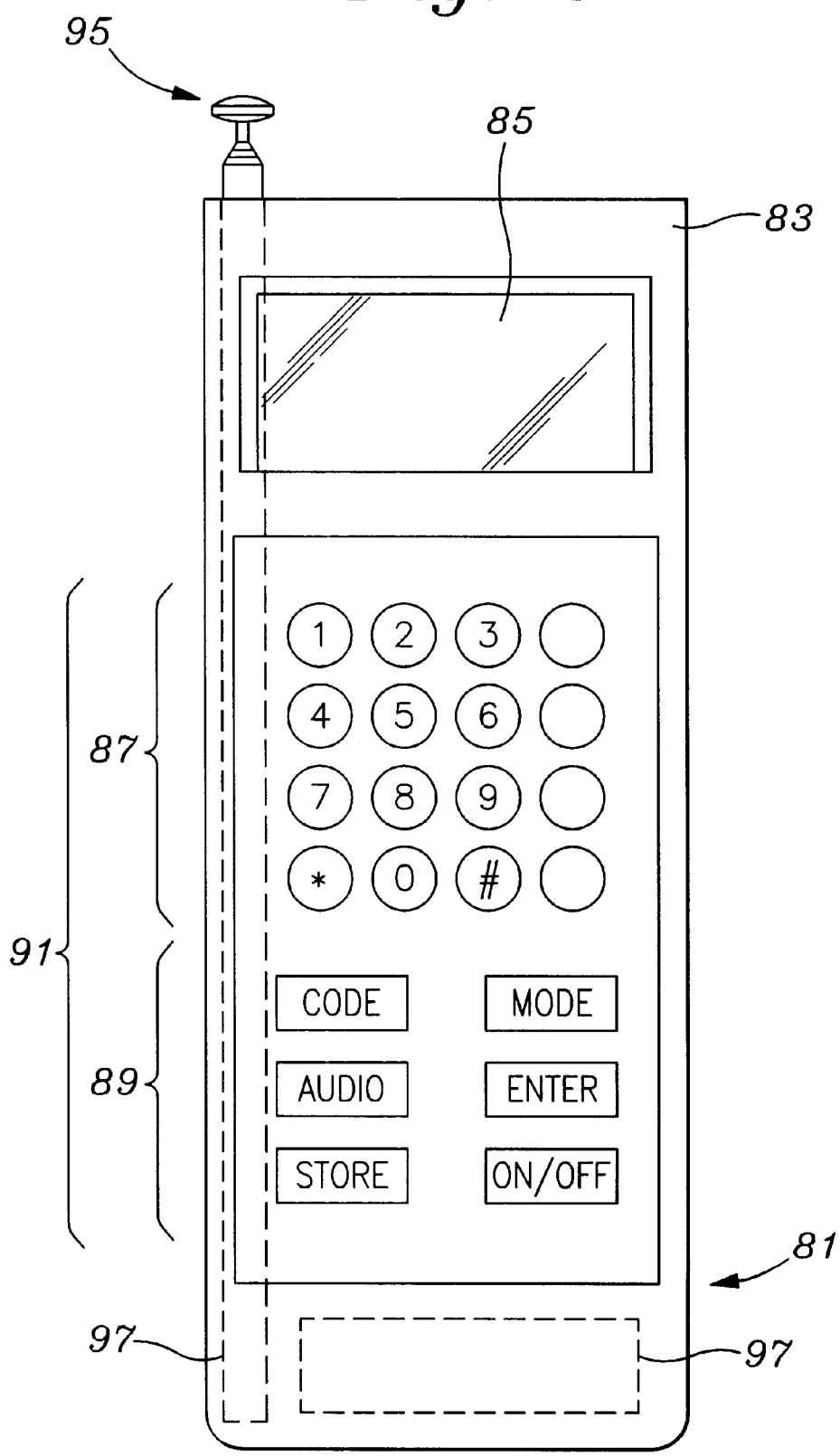
FIG. 5 a view of a fully programmable indicator unit with liquid crystal display, programmability, scanning and transponsive activity capability.

Referring to FIG. 5, one embodiment of an indicator unit 29 is seen as an indicator unit 81. Indicator unit 81 is seen to possibly be of pocket size with a housing 83 and a baggage code/display indicator 85 as a liquid crystal display. A numeric key and auxiliary pad 87 includes numbers for input of codes, and supplementary keys for controlling the input. A series of command keys 89 are seen below the numeric key and auxiliary pad 87 and form an input keypad 91. An antenna 93 is shown to the left of the indicator unit 81 and is thus, when positioned internally, is oriented so that the longest portion fits within the housing of the indicator unit 81. Antenna 93 can have an external extendable portion 95 wherein the user is enabled to extend the antenna 93 in order to maximize the sensitivity of the indicator unit 81 in order to either further make certain that the luggage or baggage containing the luggage location unit 41 is not present, or to simply increase the reliability of communications between the transmitter and receiver. Also shown in dashed line format is a battery 97 which may number several and are provided with due consideration to the weight and long operation of the indicator unit 81.

Figure 6:
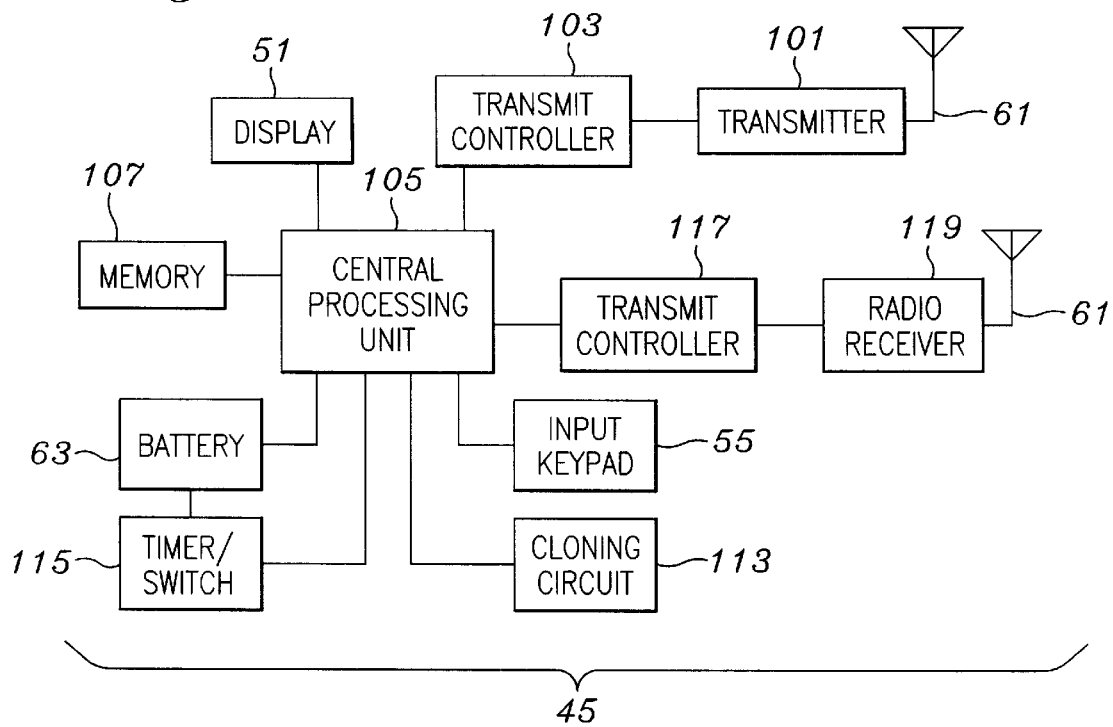
FIG. 6 is a block diagram of the full capability programmable transponding baggage location unit seen in FIGS. 2 and 3.

Referring to FIG. 6, one possible realization for the location unit 41 is shown in block diagram format. A TRANSMITTER 101 is shown as being connected to the antenna 61 and to a TRANSMIT CONTROLLER 103. The TRANSMIT CONTROLLER 103 can be of a type which can modulate the TRANSMITTER 101 in order to control output frequency, transmit mode, and also to select the method upon which information is transmitted or modulated with respect to each mode. The TRANSMIT CONTROLLER 103 is connected to a CENTRAL PROCESSING UNIT 105 which in high end units may be completely programmable. CENTRAL PROCESSING UNIT 105 is connected to the input keypad 55 seen in FIGS. 2 & 3 and to the battery 63 seen in FIG. 3. CENTRAL PROCESSING UNIT 105 may have a connected MEMORY 107, and is also connected to the display 51. A CLONING CIRCUIT 113 may also be provided for automatic interrogative programming with respect to analog and digital cellular phones, and preexisting pagers. In the case of a pager, a user provided numeric code can cause the cloning circuit to monitor pager frequencies and perhaps automatically subsume and record the pager identity which corresponds with the user's pager. Thereafter, the combination of CENTRAL PROCESSING UNIT 105, TRANSMIT CONTROLLER 103 and TRANSMITTER 101 can direct a signal directly into a user's pager to identify proximity of the luggage 37 while inside the aircraft fuselage.

For really flexible operation, a TIMER/SWITCH block 115 is connected to both the battery 63 as well as the CENTRAL PROCESSING UNIT 105. In this connective configuration the TIMER/SWITCH block 115 can provide a very low battery drain and can initiate and control a sleep mode of the CENTRAL PROCESSING UNIT 105 without having to use the timer normally present in the the CENTRAL PROCESSING UNIT 105 in order to control the periodic on and off functions. For example, in order to conserve energy, the TIMER/SWITCH block 115 can be set through programming provided to the the CENTRAL PROCESSING UNIT 105 to turn on and initialize the the CENTRAL PROCESSING UNIT 105 only during thirty seconds each hour. Alternative programming may provide for the CENTRAL PROCESSING UNIT 105 operation for one minute every fifteen minutes during the expected initial departure time, followed by a shut down for hours until either the destination time arrives or until time to change planes arrives at which time the traveler will want to know if his checked baggage is still traveling on the flight with him.

A RECEIVER CONTROLLER 117 may also be connected to the CENTRAL PROCESSING UNIT 105 to receive commands from a RADIO RECEIVER 119, which is also preferably connected to the antenna 61. The RADIO RECEIVER may be a pager receiver, or a receiver for receiving signals on several frequencies from the indicator unit 29.

Figure 7:
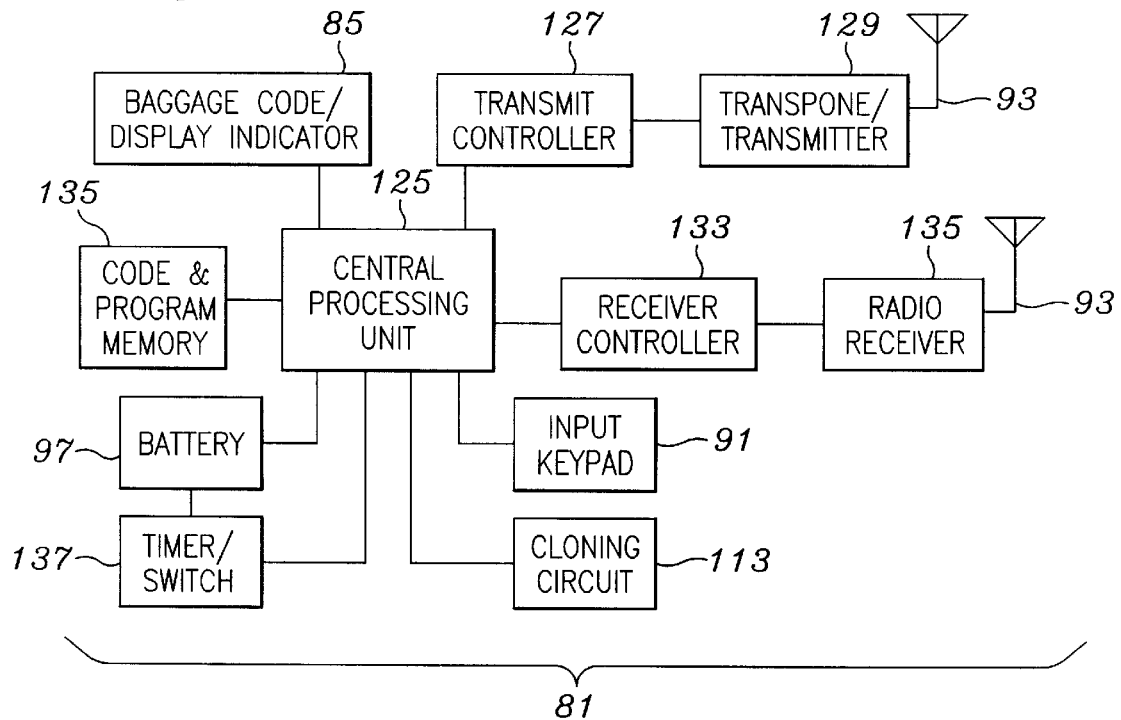
FIG. 7 is a block diagram of the full capability programmable transponding display unit seen in FIG. 5.

Referring to FIG. 7 a schematic block diagram illustrates one possible operational configuration for the indicator unit 81. The baggage code/display indictor 85 is seen as connected to a CENTRAL PROCESSING UNIT 125. Where the indicator unit 81 has transmitter capability, the CENTRAL PROCESSING UNIT 125 will be preferably connected to a TRANSMIT CONTROLLER 127 which is in turn connected to TRANSMITTER 129. The TRANSMITTER 129 is connected to the antenna 93 seen in FIG. 5.

CENTRAL PROCESSING UNIT 125 is also connected to a RECEIVER CONTROLLER 133. The RECEIVER CONTROLLER 133 is connected to a RADIO RECEIVER 135. RADIO RECEIVER 135 is again connected to the antenna 93 seen in FIG. 5. CENTRAL PROCESSING UNIT 125 is also configured for scanning and transponder operation. The luggage location unit 45 may be programmed to either (1) sequentially transmit over more than one frequency or (2) more than one mode on such frequency, the CENTRAL PROCESSING UNIT 125 may be programmed to scan all such frequencies sequentially in order to pick up an indication of the proximity of the luggage location unit 45. With programming in transponder capability, the indicator unit 81 can put out a signal to instruct the luggage location unit 45 to echo a signal on all of the frequencies within their communication capability so that communication could be had on the clearest of those frequencies. In a pure scanner function, the luggage location unit 45 simply transmits at given points in time at a signal duration longer than the channel changing and listening duration of the scanning indicator unit 81. In this mode of operation, the luggage location unit 45 transmits at given times through each of its frequencies and modulation modes simply as a matter of course. In this configuration, it is simply up to indicator unit 81 to pickup a code identifying the luggage location unit 45, and associated with the baggage unit 37 in which it is located. As a result of this mode of operation, and where three such baggage units 37 each containing a luggage location unit 45 are located within the air frame 33, one might be located so that it best communicates with the indicator unit 81 on a first frequency at a first modulation type, where as the others may be more readily identified on other frequencies and at other modulations. The indicator unit 81 simply scans through all common frequencies and modulation modes during its receive cycle and until the coded signals from all three luggage location units 45 are received. CENTRAL PROCESSING UNIT 125 may be programmed to shut down once either all of the requisite signals are received, or upon the elapse of a given amount of time. After all, at take off, as the aircraft is backing out of the terminal, the baggage unit 37 containing the luggage location unit 45 has either made it to the baggage hold space 35 of the aircraft 21, or it has not. A scan limited to from between 3–5 minutes is likely to exhaustively determined the presence of the baggage unit 37 luggage location unit 45 if it is present on the aircraft 21.

Indicator unit 81 also includes a CODE & PROGRAM MEMORY 135 so that the codes of the luggage location unit 45 can be stored as well as enabled, as when a trip is taken where not all of the luggage location units 45 are taken along.

Battery 97, seen in FIG. 5, is also seen in FIG. 7 and connected to the CENTRAL PROCESSING UNIT 125. A TIMER/SWITCH 137 is connected preferably to both the CENTRAL PROCESSING UNIT 125 and the TIMER/SWITCH 137 so that the timer may operate independently and so that the CENTRAL PROCESSING UNIT 125 can be shut down for long periods of time and preferably automatically cause the CENTRAL PROCESSING UNIT 125 to power up at the next time when a luggage check is needed, if such function is programmed into the TIMER/SWITCH 137 through the CENTRAL PROCESSING UNIT 125. Also shown is a CLONING CIRCUIT 141 connected to the CENTRAL PROCESSING UNIT 125 where either another existing indicator unit 81, or another luggage location unit 45, or another component such as a cell phone can be cloned, or where another component such as a pager can be emulated. For cloning, another instrument, such as a cell phone can be linked with a luggage location unit 45, especially where the luggage location unit 45 doesn't have its own cloning unit. Where a family purchases a second indicator unit 81, the cloning feature of CLONING CIRCUIT 81 can be used to bring the new indicator unit 81 up to date on the programming, codes, frequencies, etc. of the first indicator unit 81. In the alternative, where a family purchases a second luggage location unit 45, and especially where the second luggage location unit 45 itself has no cloning feature, such as when the first indicator unit 81 is used to program the luggage location units 45. With these possibilities, it can be seen that a system can be used in which either the indicator unit 81 or the cloning feature of CLONING CIRCUIT 81 can be used to bring the new indicator unit 81 up to date on the programming, codes, frequencies, etc.

The fully user programmable luggage location unit 45 and indicator unit 81 sacrifice some size, weight, battery size and battery longevity advantages for full programability and virtually complete user flexibility in terms of satisfying a wide possibility of operating modes. In terms of a single function, preferably preprogrammed, and available with pre-programmed codes, many of these advantages can be regained.

Referring to FIG. 8, a plan view of a small version of an indicator unit 29 is seen as an indicator unit 151 having a housing 153, internal flat antenna 155 and main radio receiver chip 157. Internal flat antenna 155 would, because of its small size and flat profile, be especially amenable for configuring for alternative orientational modes, such as circular polarization, with or without the use of phase delay, as well as the use of different phased polarization. A series of pulses can be output such that each may be at a particular orientation with each subsequent transmission having a changed angle. The use of a first polarization with subsequent polarizations at forty five degrees difference would produce a pulse set having four different phase orientations, the fifth being omitted as simply a one hundred eighty degree or inversion of the first pulse in the set. Other variations are possible, including right and left hand polarization. However, since the antenna 155 is associated with the indicator unit 151, an automatic tuning or scanning function can be used, as well as a "spread spectrum" arrangement for receiving, such as a multi path logic array which enables the receiver or tuner to responds either instantaneously or by detection to the best configuration for maximizing the incoming signal.

A series of four surface mount light emitting diodes 161, 163, 165, and 167 each of which is set to light when a corresponding transmitter carrying a pre-coded identity signal is received. Although only four such emitting diodes 161, 163, 165, and 167 are seen, it is understood that any number may be used. Four such diodes 161, 163, 165, and 167 are seen as it is believed that a traveler would probably have four or less checked items. Other versions of indicator unit 29 may include more or less indicators corresponding to different numbers of transmitters.

A set of pre-wired chips 169 and 171 may be provided which operate the indicator unit 151 to accomplish tasks pertinent to indicating the presence of luggage location units 41 as well as the goals of achieving small size and simple operation, etc. The indicator unit 151 is ideally provided with its associated transmitting units such that the user need do nothing more than turn the units on and place them within the units of luggage 37. Tasks for the pre-wired chips 169 and 171 may include responding to a powering up signal provided by a push button switch 175, turning on the main radio receiver chip 157 for continuous listening coverage of a single pre-specified radio frequency and modulation mode. In order to conserve battery power, the indicator unit 151 should be pre-programmed to at least shut down after two to three minutes.

Since the luggage location units 41 are out of manual control range and since for a minimalist programmability the transponsive operation has been eliminated, the preferable communications protocol involves only periodic bursts of electromagnetic signal from a luggage location unit in the position of luggage location unit 41. This requires a continuous period of radio frequency monitoring for at least the period necessary to insure that a signal from a luggage location unit 41 has been sent.

As a result, an automatic cycle of the indicator unit 151 will preferably enable powering up, continuous reception for the time necessary to hear one or more signals if present, followed by a recordation of reception of a signal present on an associated one of the four such diodes 161, 163, 165, and 167. Thus, if all four luggage location units, such as luggage location unit 41 are present, all four diodes 161, 163, 165, and 167 will light within the luggage location unit 41 cycle period, the user will see the lights and know which luggage items 37 are present. The user then simply allows the indicator unit 151 to shut itself off once the requisite number of diodes 161, 163, 165, and 167 are seen. Where a traveler only takes two luggage location units 41, the traveler will look only for two of the diodes 161, 163, 165, and 167 to light to know that all of his luggage units 37 are on-board the aircraft.

Also shown in FIG. 8 are a pair of coin shaped batteries 181 and 183 and which are held within battery clips 185 and 187 respectively. Using the battery saving short cycle time for active reception, the indicator unit 151 is enabled to operate with such small coin shaped batteries 181 & 183. The entire indicator unit 151 can be about four inches long and about one and a half inches wide. Again, it should ideally become commercially available with as many luggage location units 41 as it is enabled to show receipt of associated coded signals to show presence within an aircraft.

Other programming features may include, in addition to the confirmation of the presence of the location unit 41 by diodes 161, 163, 165, and 167, a beep at the time each of the by diodes 161, 163, 165, and 167 is illuminated. Another feature is preferably a longer or different or two tone beep after a complete transmit cycle of the location unit 41 (a time by which the location unit 41 should have been heard, if at all) to get the attention of the traveler, to indicate to the traveler that the unit is about to shut off and to have the traveler take stock of which location units 41 have had signals associated with them received and which have not. This should typically occur about thirty seconds before shut down. Preferably, the indicator unit 151 may be set to receive very short 9600 baud serial format bursts. The location unit 41 should conversely transmit such very short 9600 baud serial format bursts within an active window of time, followed by a rest period. The active window may include a ten second window during which two or three of the transmission bursts occur, and then followed by a fifty second rest period. This creates a one minute cycle time. The one minute cycle time represents the minimum period during which the indicator unit 151 should be on, and preferably the indicator unit 151 will be programmed to stay on through at least two such one minute cycle times.

Referring to FIG. 9, a minimalist luggage location unit 41 is shown as a luggage location unit 201 in plan view. Luggage location unit 201 has a housing 203, internal flat antenna 205 and a main radio transmitter chip 207. Internal flat antenna 205 has the same potential and capability as was mentioned with respect to internal flat antenna 155, including circular polarization, with or without the use of phase delay, the use of different phased polarization, and sequential changed angle transmission. Where the luggage location unit 201 transmits automatically, it is possible to program the device to step through phasing of the internal flat antenna 155. Where transponding operation is had, where the luggage location unit 201 can respond to the 151 indicator unit 151, antenna phase is simply another aspect which can be probed for full transpondence, along with frequency and operating mode, etc.

A logic chip 209 is also present as well as an LED (light emitting diode) indicator 211 which may be used to show a power on as well as a low battery condition. In order to save power, it is preferable that the indicator 211 is lit only momentarily, such as on for a period of several seconds to indicate that the luggage location unit 201 is switched on. Where the indicator 211 indicates a low battery condition, it should flash intermittently, such as once every 10 seconds, so that if the low battery condition is reached while it is in service, the luggage location unit 201 may continue its transmit function for as long as possible under such low battery condition.

Adjacent the logic chip 209 is a dip switch set 215 having a set of four switches 217. Dip switch set 215 gives the additional flexibility of being able to use $2^N$ codes where N is the number of dip switches 17. Dip switch set 215 is shown with four switches 17 to give a total possibility of 16 codes. This is optional, and as has been previously stated, the luggage location unit 201 can be provided commercially along with the indicator unit 151 where both have codes hard wired. In hard wired fashion, the numbers of codes available on manufacturing may be of a higher number. In the configurations of the luggage location unit 201 and indicator unit 151, the indicator unit 151 may be available with a hard wired code and sold with at least one luggage location unit 201 for which the user sets the dip switches 17 of the dip switch set 215. With the dip switch set 215 provided, additional units can be purchased and added to the operating set from which the indicator unit 151 will track and record signals.

Further, since each indicator unit 151 shown in the FIG.s, for example, is to receive signals from up to four luggage location units 201, the dip switch set 215 can have the first two switches 17 related to a setting matching the identity of the indicator unit 151, while the last two switches 17 can indicate which of the four indicator light emitting diodes 161, 163, 165, and 167 which the user wants to associate with the luggage location unit 201. It will be preferable to add dip switch set 215 having more such dip switches 17 and positions to indicate more complex numeric codes.

Also seen is a slide switch 219 which is used to turn the luggage location unit 201 on and leave it on. Luggage location unit 201 may also have a program which causes power shut down after a period of time, say either 12, 24, or 48 hours, in order to conserve battery power. Such an option may be selectable by the traveler, in an attempt to avoid battery depletion by simply forgetting to turn the luggage location unit off.

Also shown in FIG. 9 are a pair of coin shaped batteries 221 and 223 and which are held within battery clips 225 and 227 respectively. Using the battery saving short cycle time for active reception, the Luggage location unit 201 is enabled to operate with such small coin shaped batteries 221 & 223. The entire indicator unit 151 can be about four inches long and about one and a half inches wide. Again, it should ideally become commercially available with as many luggage location units 41 as it is enabled to show receipt of associated coded signals to show presence within an aircraft.

FIG. 10 is a rear view of the baggage location unit 201 of FIG. 9 and illustrating the nondescript nature of the housing. FIG. 11 is a side view of the baggage location unit 201 of FIGS. 9 and 10 and showing the slimline construction and how accessible the switch 219 is to the touch.

While the present invention has been described in terms of a proximity communication system and structure as well as structures and methods for verifying the proximity and location of baggage in order to enable early notification and action to avoid loss as well as to recover same after some loss has occurred, one skilled in the art will realize that the structure and techniques of the present invention can be applied to many similar devices. The present invention may be applied in any situation where proximity, identification and location of objects is needed.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A luggage tracking system comprising:

a luggage location unit having a transmitter for transmitting an identifying code in a transmit cycle including a intermittent sending interval and rest interval, and having a housing for carriage inside a unit of luggage within a fuselage of an aircraft; and an indicator unit having a receiver for receiving said identifying code over a limited continuous reception time greater than said transmit cycle from within said fuselage and for indicating receipt of said identifying code to indicate a presence of said luggage location unit and thus the unit of luggage within which it is carried.

2. The luggage tracking system of claim 1 wherein said luggage location unit is programmed to operate within an operational period and including a first period of time over which said transmitter emits short pulses of electromagnetic energy carrying said identifying codes, separated by a series of even intermitent time periods within said first period as said sending interval, and followed by a second period of time over which said transmitter rests without emitting said short pulses of electromagnetic energy as said rest interval.

3. The luggage tracking system of claim 2 wherein at least one of said first and said second periods is randomized.

4. The luggage tracking system of claim 3 wherein said randomization of said at least one of said first and said second periods occurs within said operational period such an increase in said first period results in a decrease of said second period.

5. The luggage tracking system of claim 4 wherein said indicator unit is programmed such that once turned on, said indicator unit automatically remain active through at least a time which exceeds said a limited continuous reception time.

6. The luggage tracking system of claim 4 wherein said first period is at least one of a time necessary to output a burst of energy and a window of time including a sum of said a time necessary to output at least two bursts of energy with at least one sending interval therebetween.

7. The luggage tracking system of claim 1 wherein at least one of said luggage location unit and said indicator unit includes a receiver and a transmitter respectively such that said at least one of said luggage location unit and said indicator unit is capable of transceiving.

8. The luggage tracking system of claim 7 wherein said luggage location unit includes a receiver capable of receiving commands to control said transmitter of said luggage location unit.

9. The luggage tracking system of claim 7 wherein said indicator unit includes a transmitter capable of communicating with and transmitting commands to said receiver of said luggage location unit.

10. The luggage tracking system of claim 9 wherein said indicator unit is capable of commanding said luggage location unit to alter at least one of its transmitter timing, transmitter mode, antenna phasing and transmitter frequencies.

11. The luggage tracking system of claim 1 and wherein said luggage location unit is a first luggage location unit, and further comprising at least a second luggage location unit, each of said at least a second location unit having an associated transmitter for transmitting an identifying code particular to each of said respective first and said at least a second location unit.

12. A method of luggage tracking comprising the steps of:

turning on a first luggage location unit having at least a transmitter;

inserting said first luggage location unit inside a first unit of luggage;

turning on a second luggage location unit having at least a transmitter;

inserting said second luggage location unit inside a second unit of luggage;

presenting said first and said second unit of luggage to be carried by an airline on at least one aircraft;

taking an indicator unit having at least a receiver to the vicinity of a luggage retrieval point once said unit of luggage is taken off of said at least one aircraft; and receiving a signal from said luggage location unit to independently verify a presence of said first and said second unit of luggage in the vicinity of said luggage retrieval point.

* * * * *